US010330199B2

(12) United States Patent
Peguero

(10) Patent No.: US 10,330,199 B2
(45) Date of Patent: Jun. 25, 2019

(54) HYDRAULIC MOTOR CAPABLE OF MANY DIFFERENT APPLICATIONS ABLE TO USE LOW PRESSURE OR HIGH PRESSURE FLUIDS TO OPERATE

(71) Applicant: Weldy Rafael Peguero, Fair Lawn, NJ (US)

(72) Inventor: Weldy Rafael Peguero, Fair Lawn, NJ (US)

( * ) Notice: Subject to any disclaimer, the term of this patent is extended or adjusted under 35 U.S.C. 154(b) by 639 days.

(21) Appl. No.: 14/682,922

(22) Filed: Apr. 9, 2015

(65) Prior Publication Data

US 2015/0247453 A1 Sep. 3, 2015

Related U.S. Application Data

(63) Continuation-in-part of application No. 13/626,950, filed on Sep. 26, 2012, now Pat. No. 9,254,072.
(Continued)

(51) Int. Cl.
*F16J 10/02* (2006.01)
*F16H 19/04* (2006.01)
(Continued)

(52) U.S. Cl.
CPC ............... *F16J 10/02* (2013.01); *A46B 13/06* (2013.01); *A47L 11/26* (2013.01);
(Continued)

(58) Field of Classification Search
CPC ...... F16J 10/02; F16J 1/14; F01B 7/16; F01B 9/047; F03C 1/0076; F16H 19/043; Y01T 74/1812
See application file for complete search history.

(56) References Cited

U.S. PATENT DOCUMENTS 1,623,780 A * 4/1927 Crocker .................. F01B 9/047
91/172
2,948,266 A * 8/1960 Gratzmuller ............ F01B 9/047
91/186
(Continued)

FOREIGN PATENT DOCUMENTS

DE 102006003026 * 7/2007 .............. F01B 9/047

*Primary Examiner* — Christopher R Harmon
(74) *Attorney, Agent, or Firm* — Joshua Kaplan, Esq.; Kaplan Law Practice, LLC

(57) ABSTRACT

A mechanical device comprising, a gear rack having a first point and a second point; at least one piston attached either to said first point or said second point; said piston having an exterior surface and an interior surface; wherein said exterior surface is facing away from said gear rack and wherein said gear rack is attached to said interior surface; said gear rack being gyratingly coupled with an actuator shaft; wherein said gear rack is capable of moving in a substantially linear direction due to a force being applied to said exterior surface or said interior surface; and wherein said actuator shaft rotating due to the said motion of said gear rack; in another embodiment, at least one piston having an interior surface and an exterior surface; said inner side pivotingly mated with a connecting rod; said connecting rod having an opposing point B which is rotationally fastened to a counterbalance; said counterbalance rotating about an actuating shaft; a cylinder chamber having with a top breach housing said at least one piston; a pull shaft pivotingly connected to said exterior surface with pivoting joint and to a gear rack with a second pivoting joint; said pull shaft reciprocly advancing within said top breach; said reciprocation causing said gear rack to similarly reciprocate causing rotation of an input shaft; wherein said input shaft is mated with said gear rack through a one way gear box; and an accelerating spark plug, disposed in the body of said cylin- (Continued)

der chamber for igniting combustible materials introduced into said cylinder chamber.

12 Claims, 15 Drawing Sheets

Related U.S. Application Data

(60) Provisional application No. 61/977,554, filed on Apr. 9, 2014.

(51) Int. Cl.
| | | |
|---|---|---|
| *F02P 13/00* | (2006.01) | |
| *F16J 1/14* | (2006.01) | |
| *A46B 13/06* | (2006.01) | |
| *A47L 11/26* | (2006.01) | |
| *A47L 11/40* | (2006.01) | |
| *F03C 1/007* | (2006.01) | |
| *F01B 7/16* | (2006.01) | |
| *F01B 9/04* | (2006.01) | |
| *F02B 75/28* | (2006.01) | |
| *D06F 9/00* | (2006.01) | |

(52) U.S. Cl.
CPC ....... *A47L 11/4038* (2013.01); *A47L 11/4069* (2013.01); *A47L 11/4088* (2013.01); *F01B 7/16* (2013.01); *F01B 9/047* (2013.01); *F02B 75/28* (2013.01); *F02P 13/00* (2013.01); *F03C 1/0076* (2013.01); *F16H 19/043* (2013.01); *F16J 1/14* (2013.01); *D06F 9/00* (2013.01); *Y10T 74/1812* (2015.01)

(56) References Cited

U.S. PATENT DOCUMENTS

| | | | | |
|---|---|---|---|---|
| 3,709,098 | A * | 1/1973 | Lloyd | F01B 9/047 91/46 |
| 4,683,805 | A * | 8/1987 | Fejes | F15B 15/065 92/129 |
| 4,864,976 | A * | 9/1989 | Falero | F01B 9/047 123/48 B |
| 5,351,566 | A * | 10/1994 | Barnett | A61G 5/023 123/197.1 |
| 6,453,793 | B1 * | 9/2002 | Simonds | F01B 9/047 91/345 |
| 2004/0261750 | A1 * | 12/2004 | McKeown | F01B 9/047 123/197.1 |
| 2010/0275884 | A1 * | 11/2010 | Gray, Jr. | F01B 7/16 123/46 R |
| 2010/0294232 | A1 * | 11/2010 | Otterstrom | F01B 9/047 123/197.1 |

* cited by examiner

US 10,330,199 B2

HYDRAULIC MOTOR CAPABLE OF MANY DIFFERENT APPLICATIONS ABLE TO USE LOW PRESSURE OR HIGH PRESSURE FLUIDS TO OPERATE

CLAIM OF PRIORITY

This application claims priority of a U.S. patent application Ser. No. 13/626,950 filed on Sep. 26, 2012, the contents of which are fully incorporated herein by reference. This application is also claiming priority of an earlier filed provisional application 61/977,554 filed on Apr. 9, 2014, the contents of which are fully incorporated herein by reference, and for which this application services as the utility substitute.

FIELD OF THE INVENTION

The present invention relates to piston engines, and various alternatives of such engines designed to improve efficiency and performance.

BACKGROUND OF THE INVENTION

The use of piston engines is well known and spans over a century. Such engines come in various configurations and alignments. However, all such engines have a common feature of alternating pistons that are connected to a rotating crankshaft. The rotation of the crankshaft produces rotational power that is later translated through a series of gears, usually referred to as a transmission device, to the wheels or other moving parts of a machine that is using such a motor as a source of power.

All existing embodiments are suffering from a common shortcoming in that the rotation of the crankshaft necessarily contains dead zones, or zones of now power, where the rotational force of the piston is wasted until the crankshaft turns over into a force producing position. The present invention aims to eliminate and solve this problem by connecting pistons to a gear rack that is always moving linearly, thereby not wasting any cycles on rotation. While the present invention also contains a crankshaft like device, it is used only for the initial startup, to eliminate vibration and to prevent the cylinder head from slamming into the cylinder chamber.

Furthermore, it will be shown that the device embodied in the present invention has a plurality of different applications, such as a water propulsion engine. The reciprocating gear rack of the present invention can be retrofitted using a conventional piston on one and another piston on the other end or to a water piston of the water propulsion device.

Various implements are known in the art, but fail to address all of the problems solved by the invention described herein. One embodiment of this invention is illustrated in the accompanying drawings and will be described in more detail herein below.

SUMMARY OF THE INVENTION

It is therefore an object of the present invention to provide a hydraulic motor capable of using high-pressure or low-pressure fluids such as water, wherein the power of water pressure is applied to effectuate a number of different applications such as rotating a brush using a mechanism that produces alternating flows of water.

It is a further object of the present invention to provide an apparatus wherein water from a conventional faucet or tap is carried through flexible tubing to an hydraulic actuator which alternates the flow of water through the device using a system of valves which open and close, which flow of water causes a brush to rotate.

It is a further object of the present invention to provide an apparatus wherein a supply of water is carried to a hydraulic rotary actuator wherein a system of opening and closing valves causes water flow to alternate between two available paths, causing alternating hydraulic pressure which may be applied for cleaning, as well as a variety of other uses.

Yet another object of the present invention is provide a more efficient use of reciprocating piston motion.

Still another object of the present invention is to provide a continuously operating water propulsion device.

It is still another object of the present invention is to provide a smaller, more efficient engine, that produces the same or greater degree of output as a conventional internal combustion engine using conventional rotational elements. These and other features of the invention can be further understood by reference to the following drawings.

DESCRIPTION OF THE PREFERRED EMBODIMENTS

Figure 1:
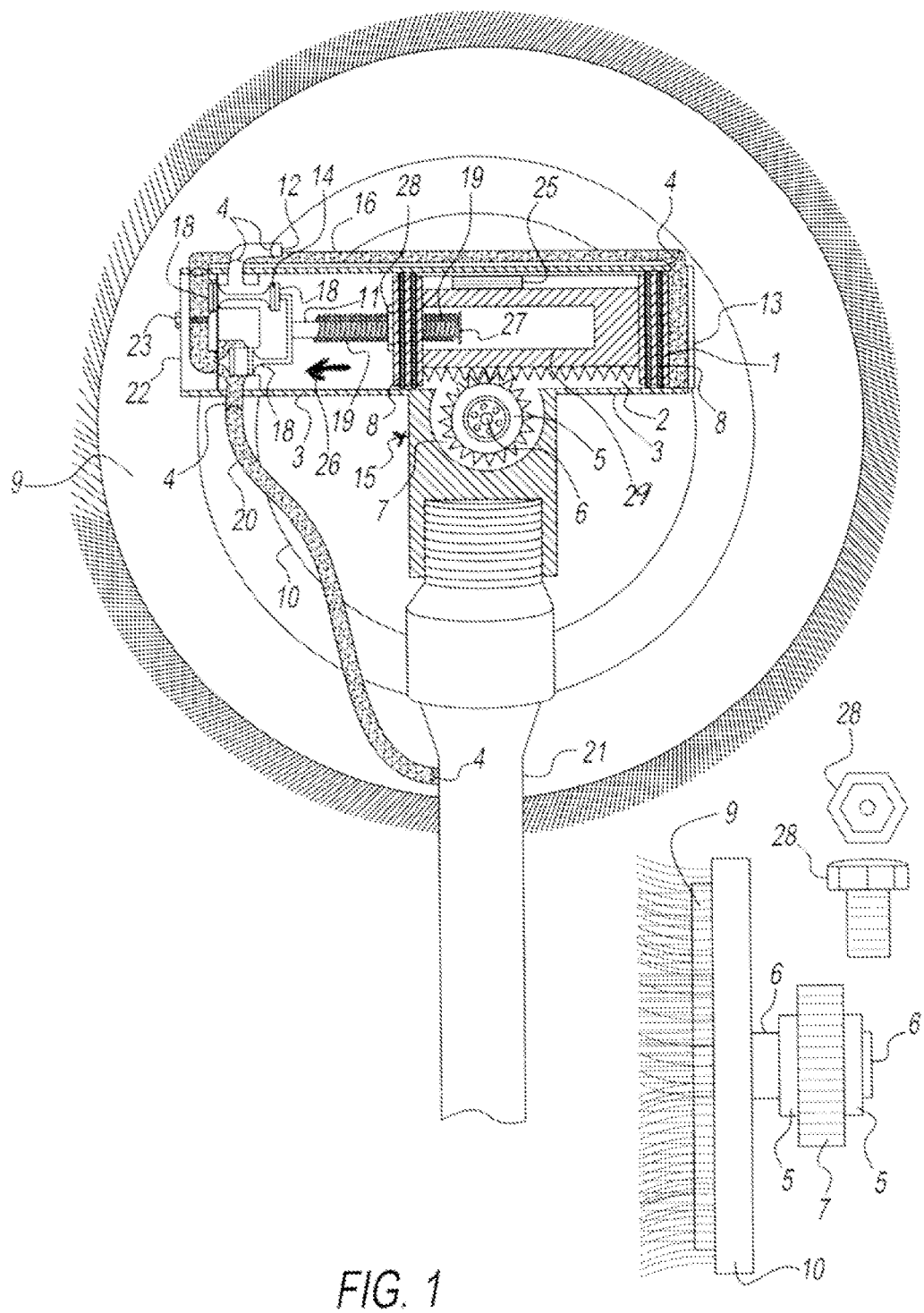
FIG. 1 shows a bottom schematic view of the hydraulic motor according to an embodiment of the present invention that will rotate a brush.

The preferred embodiments of the present invention will now be described with reference to the drawings. Identical elements in the various figures are identified with the same reference numerals.

Reference will now be made in detail to embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Now referring to the drawings, FIG. 1 shows the hydraulic motor 21 of the present invention. Water under ordinary tap pressure is admitted through a port 4 to entry line 20 and through second port 4 to integrating valve 22. Water is then admitted through valve 18 into a chamber inside cylinder 3. Water then fills the chamber inside cylinder 3, which puts pressure upon and compresses spring 19. The piston 1 is pushed to the right by the pressure of water filling the chamber inside of cylinder 3, teeth inside the gear rack 2 engage with teeth arranged along the outside of gear 7, turning said gear 7. Rotation of gear 7 turns shaft 6 which is removably attached to brush 9, thus rotating brush 9.

Piston 1 moves to the right until the pressure of water is balanced by the tension on the spring 19. At this point Spring 19 pushes the valve trigger 11, which opens valve 22. This causes water to fill the right side of the chamber inside cylinder 3. Water pressure in the chamber inside cylinder 3 pushes piston 1 to the left, putting pressure on spring 19 and causing the engaged teeth of gear 7 to turn in the opposite direction, causing shaft 6 and brush 9 to rotate until the piston 1 reaches the point where water pressure is balanced by the tension put on spring 19. At this point, valve 22 opens and the other valve closes, causing the left side of the chamber inside cylinder 3 to begin filling with water again, starting the sequence over again. This sequence repeats until the user stops the flow of water into the system.

The foregoing figures may be further understood by reference to the following list of parts shown by name and reference number:

Piston 1
Gear Rack 2
Cylinder 3
Port 4
Bearing 5
Shaft 6
Gear 7
Piston Seal 8
Cover Brush 9
Brush 10
Valve Trigger 11
Valve Exit Line 12
End Cap 13
Plug Seals 14
Hydraulic Rotary Actuator 15
Water Line to Cylinder 16
Connector 17
Valve Plug 18
Spring 19
Entry Line to Valve 20
Extension Pipe 21
Integrating Valve 22
Valve Connection Screw 23
Soap Dispenser 24
Support for Piston 25
Direction of Piston 26
Retaining Screw for Spring 27
Bolt with hole in center to accommodate piston trigger 28
Hollow chamber for Valve trigger 29

Figure 2:
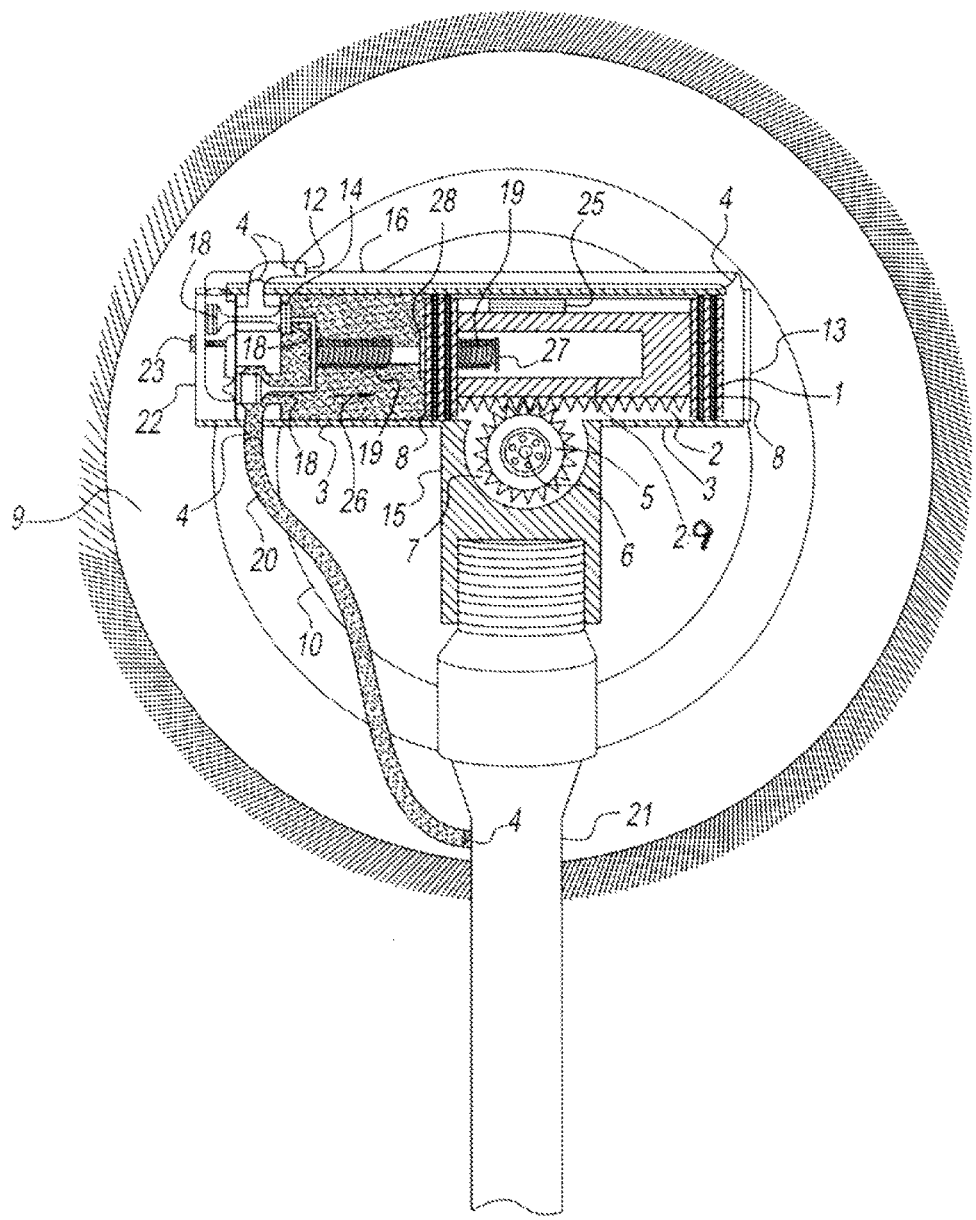
FIG. 2 shows a bottom schematic view of the hydraulic motor according to an embodiment of the present invention that will rotate a brush.

FIG. 2 shows the further progression of fluid through the hydraulic motor, causing movement of fluid filling the left chamber of cylinder 3, pushing the piston 1 in the direction shown by the arrow 26 to the right.

Figure 3:
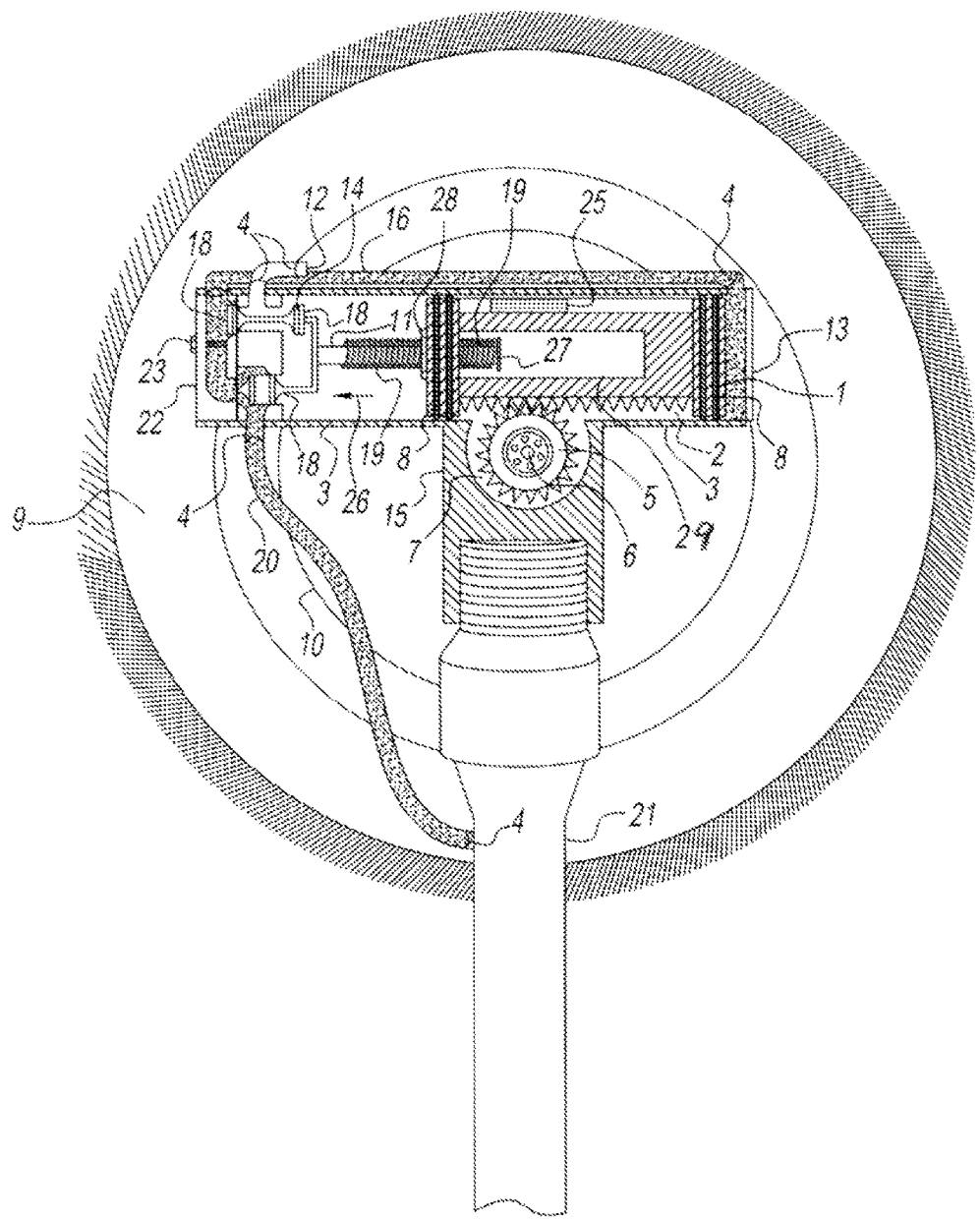
FIG. 3 shows a bottom schematic view of the hydraulic motor according to an embodiment of the present invention that will rotate a brush.

FIG. 3 shows the further progression of fluid through the hydraulic motor, filling the right side of the chamber of cylinder 3, pushing piston 1 in the direction shown by the arrow 26, to the left.

Figure 4:
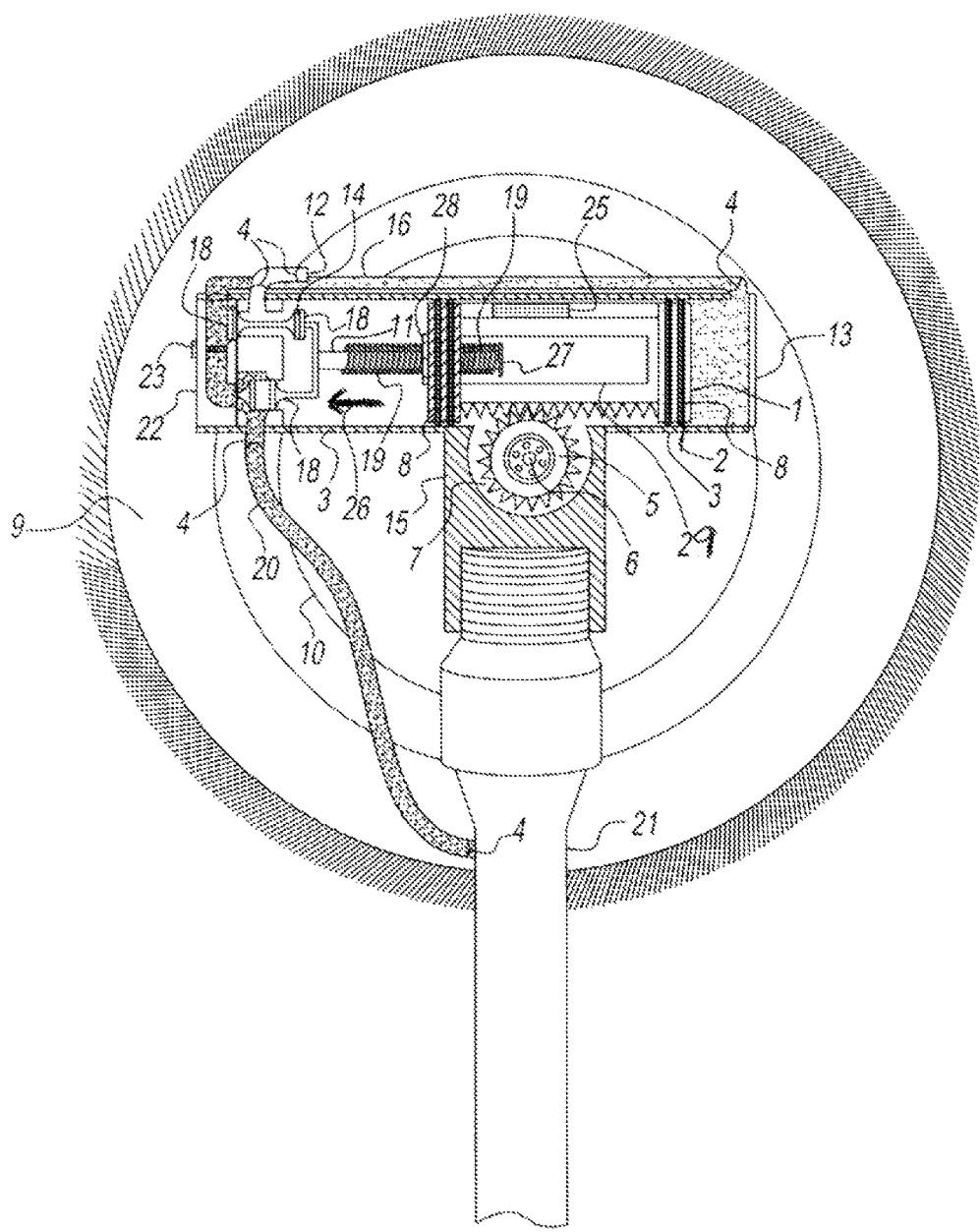
FIG. 4 shows a bottom schematic view of the hydraulic motor according to an embodiment of the present invention that will rotate a brush.

FIG. 4 shows the further progression of fluid through the hydraulic motor, further filling the right side of the chamber of cylinder 3, pushing piston 1 in the direction shown by the arrow 26, to the left.

Figure 5:
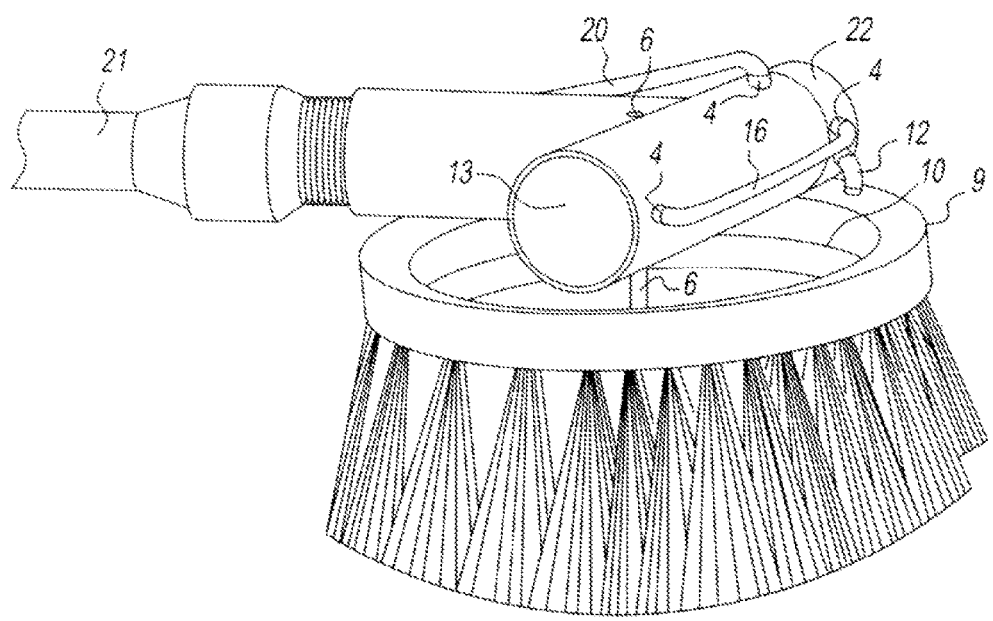
FIG. 5 shows an elevated schematic view of the brush rotated by the hydraulic motor, from the side according to an embodiment of the present invention that will rotate said brush.

FIG. 5 shows the exterior parts of the hydraulic motor, illustrating the port 4, the shaft 6, the cover brush 9 the brush 10, the valve exit line 12, the end cap 13, the water line to the cylinder 16, the entry line to valve 20, the extension pipe 21 and the integrating valve 22.

Figure 6:
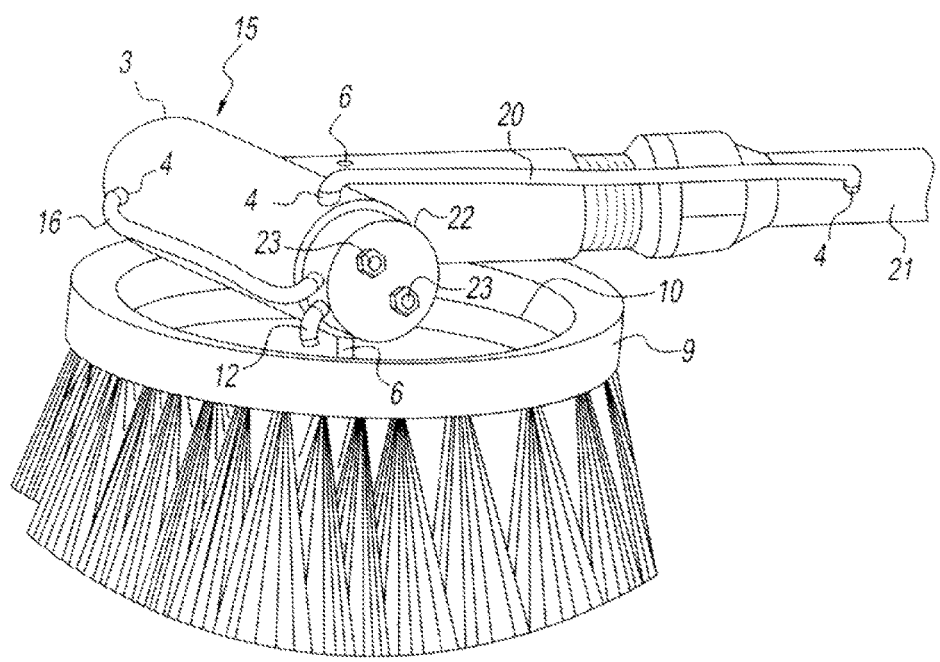
FIG. 6 shows an elevated schematic view of the brush rotated by the hydraulic motor, from the other side according to an embodiment of the present invention that will rotate said brush.

FIG. 6 shows the exterior parts of the hydraulic motor from the other side, illustrating the cylinder 3, the port 4, the shaft 6 the cover brush 9, the brush 10, the valve exit line 12, the hydraulic rotary actuator 15, the water line to the cylinder 16, the entry line to valve 20, the extension pipe 21, the integrating valve 22 and the valve connection screws 23.

Figure 7:
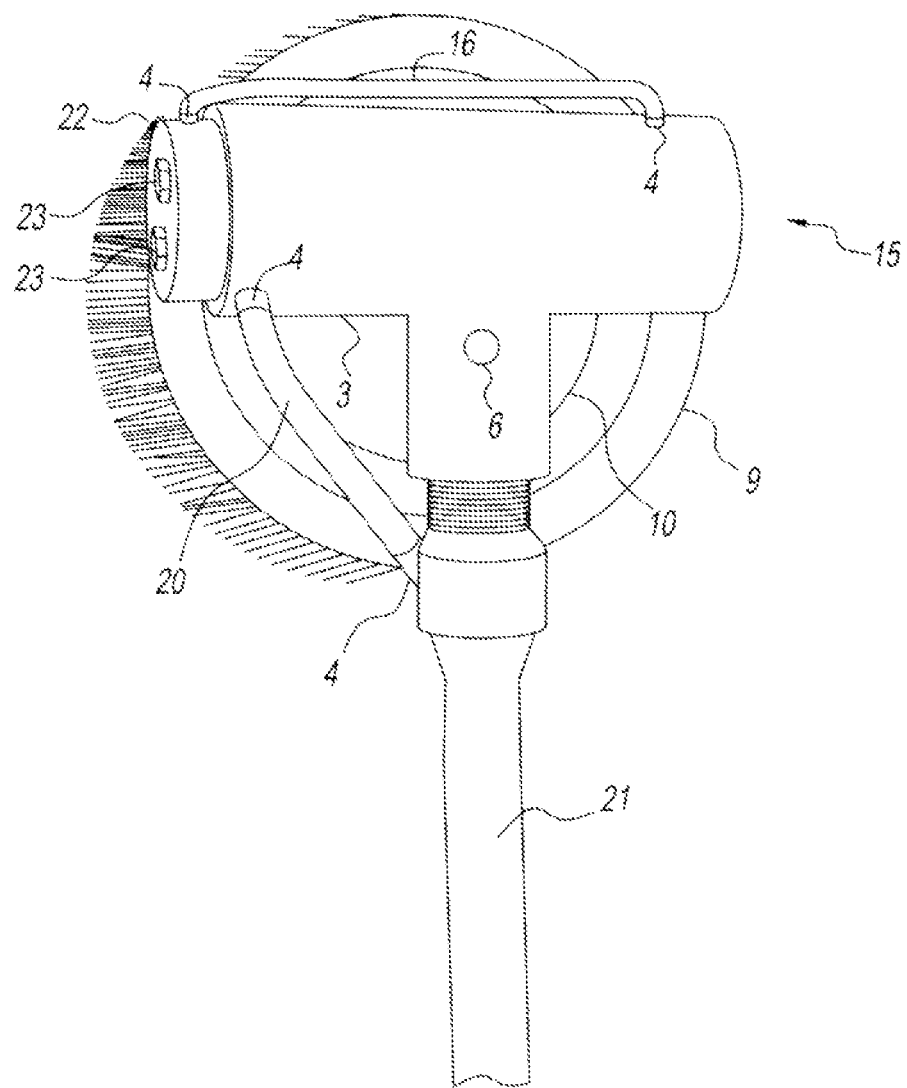
FIG. 7 shows an elevated schematic view of the top of the hydraulic motor according to an embodiment of the present invention that will rotate a brush.

FIG. 7 shows the exterior parts of the hydraulic motor from the top, illustrating the cylinder 3, the port 4, the shaft 6, the cover brush 9, the brush 10, the hydraulic rotary actuator 15, the water line to the cylinder 16, the entry line to valve 20, the extension pipe 21, the integrating valve 22 and the valve connection screws 23.

Figure 8:
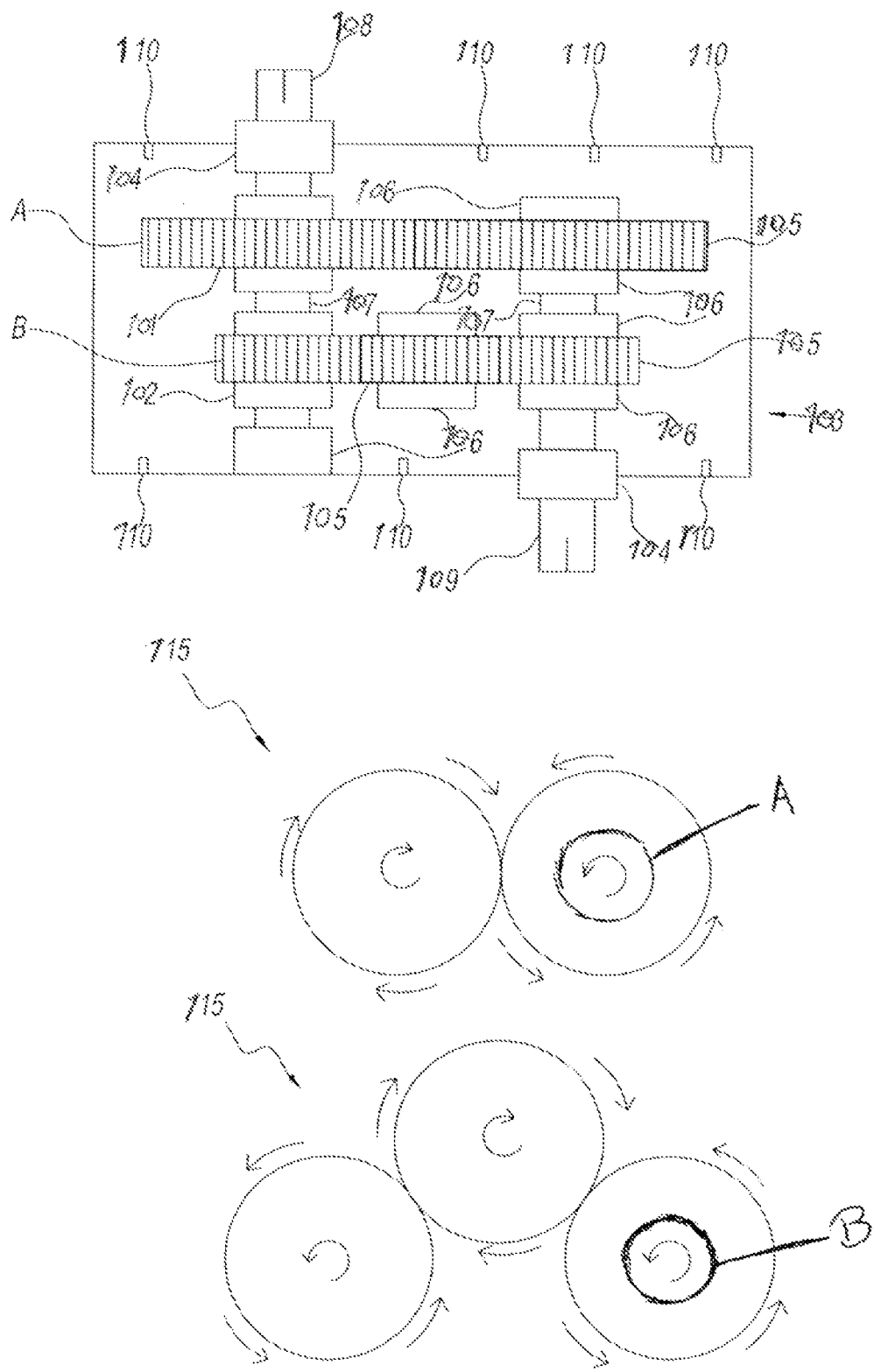
FIG. 8 shows an elevated schematic view of the side of a one-way gear box, which may be attached to the hydraulic rotary actuator of the hydraulic motor of the present invention to convert the alternating flow of water, which causes an alternating rotation of a shaft, to a one-way continuous rotation, producing an embodiment of the present invention suitable for many different applications.

FIG. 8 shows a one-way gearbox, which may be attached to the hydraulic motor of the present invention to the shaft 1 shown in FIG. 1. The one-way gearbox will allow the shaft to rotate in only one direction, enabling the present invention to be applied to a wide variety of applications. A one-way gear or gear clutch 101 is mounted on the shaft, and will clutch when motion goes to the right. A second one-way gear or gear clutch 102 is mounted on the shaft and will clutch when motion goes to the left. The body 103 of the one-way gearbox contains the gears, the shaft and the bearings. The bearing 104 will reduce friction and prevent oil from leaking from the one-way gearbox. The gear 105 is attached to the shaft. The bearing 106 is mounted on the shaft to reduce friction. The gear 105 and the bearing 106 are mounted on the shaft 107. A shaft 108 connects to the hydraulic rotary actuator 15 shown in FIG. 1. A shaft 109 connects to a variety of other embodiments including a gearbox speed increaser, generator, washing machine or a variety of other applications. The body of the gear box 103 is attached to the hydraulic rotary actuator 15 shown in FIG. 1 at seven connection points 110.

The action of the one-way gear box is described in FIG. 8 by the clutch A which controls two gears, and will allow the first gear 101 and second gear 105 to rotate to the right or to the left, but gear 101 will clutch when it goes right, releasing the shaft. Clutch B controls three gears: the first gear 102 may rotate to the left or to the right, the second gear 105 may rotate to the left or to the right and the third gear 105 may rotate to the left or to the right, but gear 102 will clutch when it goes to the left, releasing the shaft.

Figure 9:
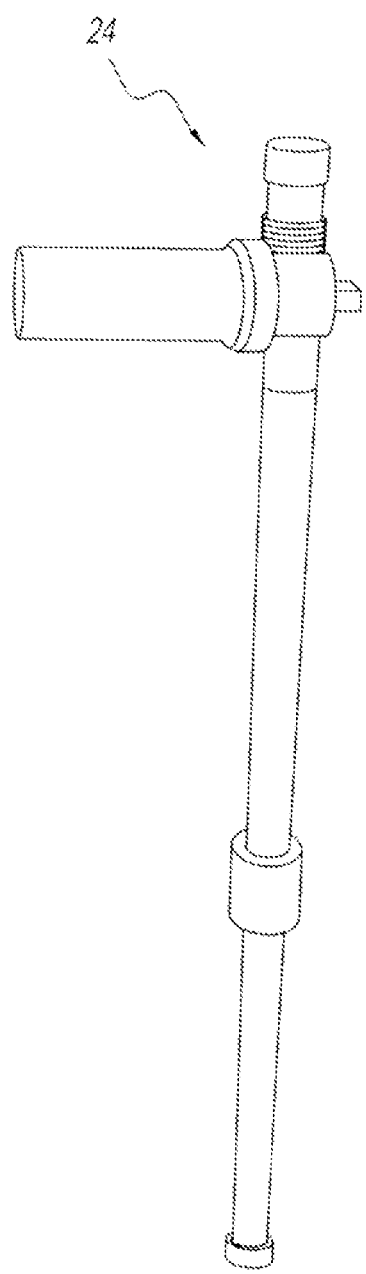
FIG. 9 demonstrates an elevated schematic view of the side of the handle and soap dispenser of the hydraulic motor according to an embodiment of the present invention which will rotate a brush.

FIG. 9 shows the extension pipe 21.

Figure 10:
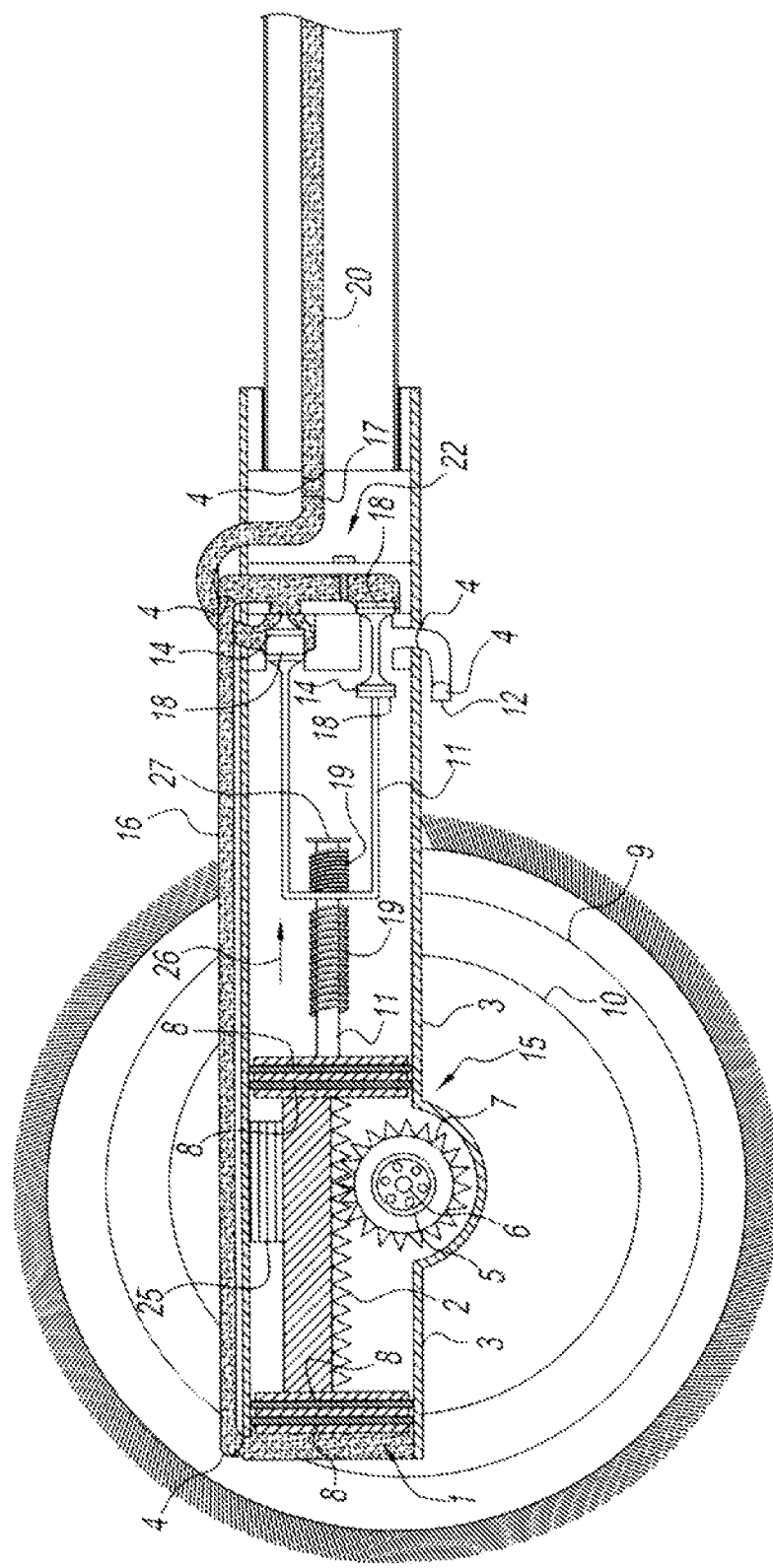
FIG. 10 shows a bottom schematic view of the hydraulic motor according to an alternate embodiment of the present invention, using a different arrangement of parts to rotate a brush.

FIG. 10 shows the progression of fluid through another embodiment of the hydraulic motor using the same parts in a slightly different arrangement, with the fluid filling the entry line to valve 20, the water line to cylinder 16, through port 4, causing movement of fluid filling the left chamber of cylinder 3, pushing the piston 1 in the direction shown by the arrow 26, to the right.

Figure 11:
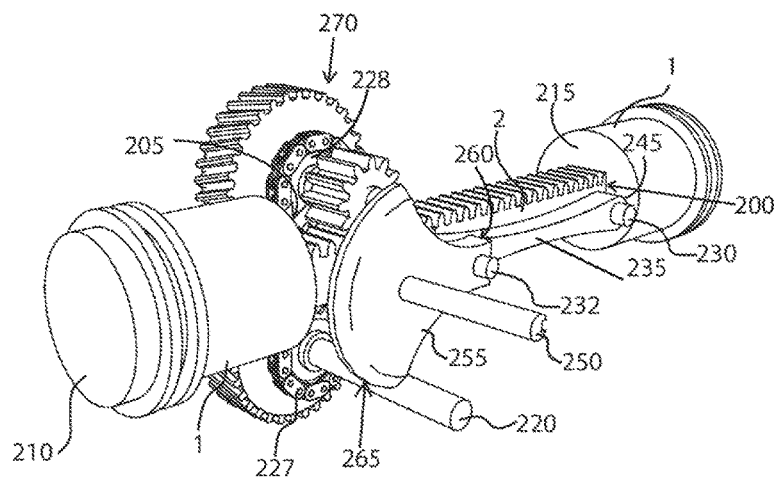
FIG. 11. shows the back of the gear rack and piston mechanism that comprises the assembly of the present invention.

The details of the mechanical device, that is comprised most basically of the gear rack 2 and the piston 1, are further described FIGS. 11-14. Shown in FIG. 11 are the gear rack 2, the first point 200, the second point 205, the piston 1, the exterior surface 210, the interior surface 215, the gear shaft 222, the gear rack connector pin 230, the connecting rod 235, the point A 240, the point B 245, the input shaft 250, the counterweight 255, the first point of the counterweight 260, the second point of the counterweight 265, the one way gear transmission 270. The gear rack 2, is shown having the first point 200 and the second point 205. The points 200 and 205 serve as mounting points for the piston 1. The present invention may have at least one more pistons 1 mounted on the gear rack 2.

Still referring to FIG. 11, the piston 1 has the exterior surface 210 and the interior surface 215. In an embodiment using hydraulic fluid, as in FIGS. 1-10, the exterior surface would come into contact with liquid, such as water. For combustion engines, the exterior surface 210 would come into contact with combustible fuels secreted into a cylinder and would create pressure necessary to achieve the proper oxygen to fuel mixture. Such piston 1 would also serve push out combustion vapors after the burn was achieved. The piston seal 8 slides along the cylinder wall, as shown in the cylinder 3 in FIG. 1, and prevents any access liquids or vapors from escaping into the cylinder cavity 29 (FIG. 1) or out of a cylinder and into the engine bay holding such a combustion engine. The interior surface 215 is mounted onto first or second points 200 or 205 of the gear rack 2. The interior surface 215 may be disposed at a 90 degree angle 275 (FIG. 12), or at any other angle with respect to the plane of the gear rack 2. The interior surface 215 and the exterior surface 210 are preferably parallel to each other or oriented at a slight angle with respect to each other.

As would be appreciated by one skilled in the art, and demonstrated in FIGS. 11-14, the gear rack 2 replaces the connector rod of a conventional engine. In the present invention, all of the pressure applied to the exterior surface 210 by the force of the combustion is translated into linear motion 273 or 273 of the gear rack 2. Unlike existing engines, where the actual linear force ranges between approximately 25% to 75%, with the rest of the force being dissipated by friction and with compressing the crankshaft in a sideways or oscillating direction, the present invention uses close to 100% of the linear force to produce the actual and direct driving force, as illustrated in items 272 and 273, to actually drive the actuator shaft 220.

As shown in FIGS. 1-10, and again in FIGS. 11-14, the gear rack 2 is gyraticly coupled with an actuator shaft 220. This connection can be direct, as illustrated in FIGS. 1-4, or through the one way gear transmission 270, as shown in FIG. 8 and FIGS. 11-14. The gyratic coupling means that the gear rack 2 and actuator shaft 220, or the gear rack 2 and the connector gear 226 are in constant contact with one another. The contact may be variably engaged in other embodiments, such as with a transmission having a neutral position. As the gear rack undergoes linear motions 272 or 273, it forces the gear shaft 222, or more directly, the connector gear 226 to rotate or to rock from side to side, thus providing driving force to whatever the actuator shaft 220 is connected to, such as vehicle or locomotive wheels, or action ends of mechanized tools. The engagement between the gear rack 2 and the connector gear 226, or any gears shown in the figures, can also be achieved using rollers, belts or chains. The gear rack 2 can be which can be positioned in a horizontal, vertical, or at any other angle with respect to the horizon, In some embodiments, such as the hydraulic embodiment shown in FIGS. 1-4, the linear force 272 or 273 is offset by the constant presence of liquid inside the cylinder 3. This counteracting force uses the momentum of the piston to push the piston back into position for the next load of fuel. When an engine is disabled, the counteracting force of such a liquid also prevents the piston 1 from damaging the cylinder chamber by slowing the linear motion of the piston 1. However, in combustion engines, such as petrol/gasoline, diesel or steam engines, the liquid fuel or steam is injected into the cylinder only if the engine is running. Once the engine is stopped, no additional fuel is fed into the cylinder chamber. Even though the engine has been stopped the piston 1 would still be in motion through inertia and would invariably slam into a wall or cap of a cylinder and damage it. To avoid this problem, and to foster a more balanced operational rhythm of an engine disclosed in the present invention, a connecting rod 235 and a counterweight 255 may used to control the linear motion of the gear rack 2, as described in FIG. 13. The connecting rod 235 is required to prevent cylinder damage in internal combustion engines, while the counterweight 255 is present to promote balance and reduce vibration and also combines with the connecting rod 235 to prevent cylinder damage.

Figure 13:
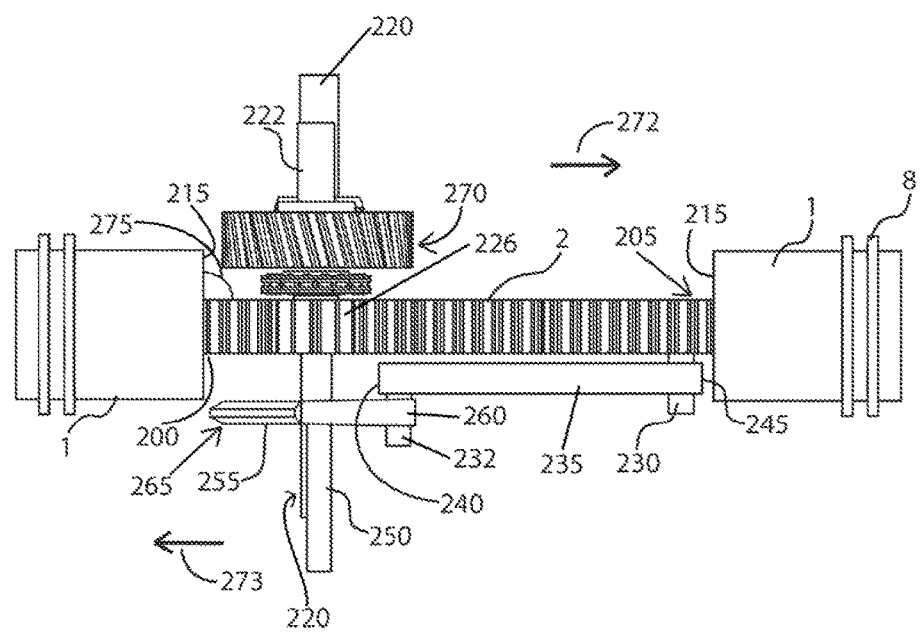
FIG. 13. is a top view of an embodiment of the present invention.
Figure 14:
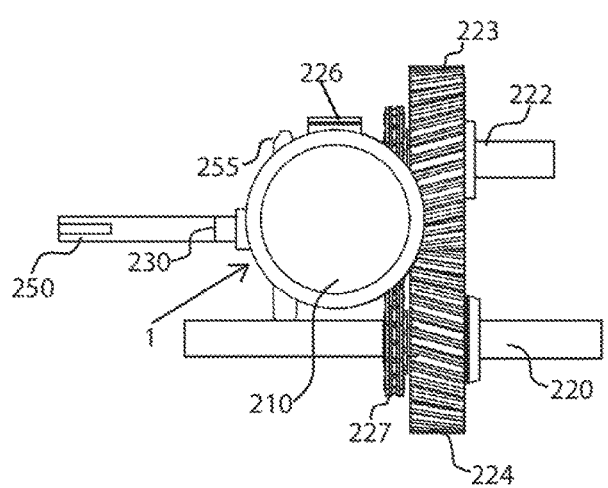
FIG. 14 is a side view of an embodiment of the present invention.

To further on the embodiment shown in FIG. 13, shown are the gear rack 2, the first point 200, the second point 205, the piston 1, the interior surface 215, the actuator shaft 220, the gear shaft 222, the connector gear 226, the gear rack connector pin 230, a second gear rack connector pin 232, the connecting rod 235, the point A 240, the point B 245, the input shaft 250, the counterweight 255, the first point of the counterweight 260, the second point of the counterweight 265, the one way gear transmission 270, the orientation angle 275. The embodiment shown in FIGS. 11, 13, and 14 is best suited for use with combustion engines for reasons described above. The connector pin 230 is mounted on the gear rack 2. The gear rack connector pin 230 is mounted near the end of the gear rack 2, either at the first point 200 or the second point 205, but may be mounted at any point along the gear rack 2. To increase the travel distance of the piston 1, a longer connecting rod 235 or a larger, heavier counterweight 255 may be used. The connector pin 230 serves as a mounting point and the pivot for the point B 245 of the connecting rod 235. The point A 240 is connected to the second connector pin 232, which connects the connecting rod 235 to the counterweight 255. The counterweight contains an input shaft 250. The input shaft 250 can be connected to a starter device (not shown) which can spin the counterweight while being assisted by an external power source, such as manual crank or a battery. When the engine is operating, the connecting rod 235, assisted by the counterweight 255, will use the momentum of the piston 1 to move the piston back into the firing position. Meaning, if the piston 1 is moving in the direction 272, the connecting rod 235, or the connecting rod 235 and the counterweight 255, will move the piston back in the opposite direction 273, to expel remaining fumes or to receive the next load of fuel. When the operation of the engine is stopped, the piston 1 will travel in a substantially linear direction until reaching the end of the connecting rod 235, at which point travel will stop or go in reverse, instead of proceeding further and slamming into the cap of the cylinder or the cylinder wall. An end cap 13 and a cylinder is shown in FIG. 2. To balance the force of the piston 1, a counterweight 255 may be added to the point A 240 and would pivot about the input shaft 250. The points A and B, 240 and 245 respectively, are interchangeable.

Figure 12:
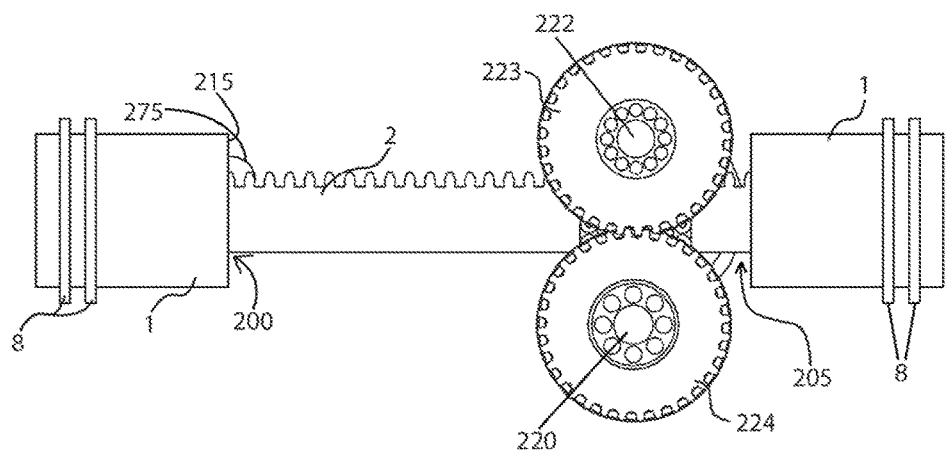
FIG. 12. is a perspective view of another embodiment of the present invention, showing the counterweight component of the assembly.

FIGS. 12 and 14 demonstrate the gear rack 2, the first point 200, the second point 205, the piston 1, the exterior surface 210, the interior surface 215, the actuator shaft 220, the gear shaft 222, the drive gears 223 and 224, the connecting gear 226 which achieves coupling or engagement of the gear rack connector pin 230, a second connector pin 232, the input shaft 250, the counterweight 255, the one way gear transmission 270, and the orientation angle 275. FIGS. 12 and 14 illustrate the operation of the one way transmission 270, as was also described in FIG. 8. FIG. 12. demonstrates the one way gear transmission 270 in an embodiment not having a connecting rod 235, while FIG. 14 illustrates the same concept with a device having a connecting rod 235, along with a counterbalance 255. A variety of transmission devices may be employed in place of the gear transmission 270.

Figure 16:
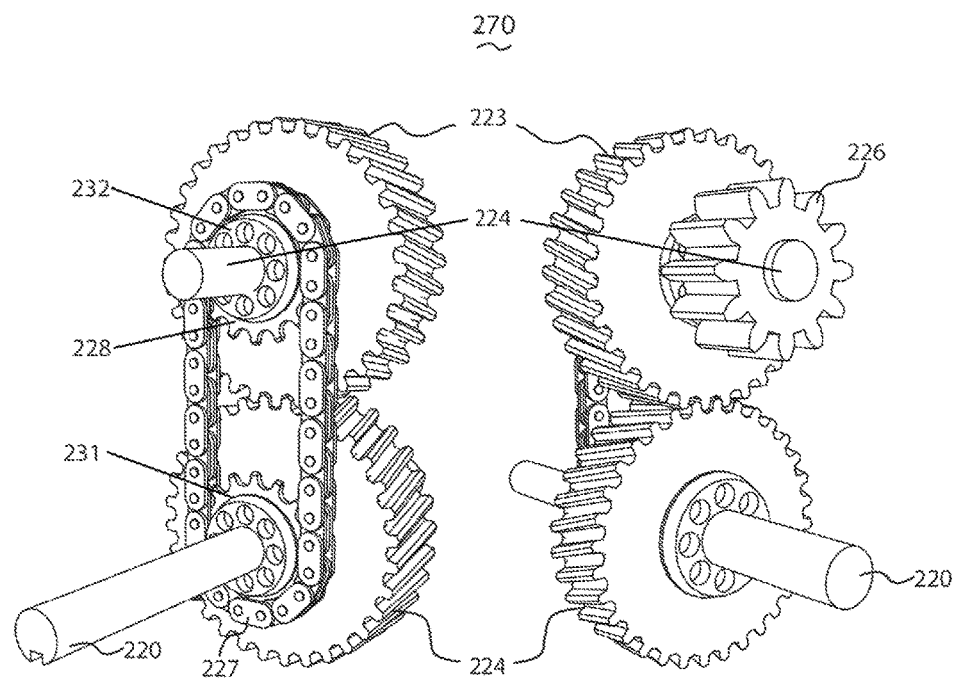
FIG. 16 is a two sided diagram of the one way gear box.

Still referring to FIGS. 12 and 14, the one way gear box contains the connecting gear 226. This gear is gyratingly coupled with the gear rack 2. As the connecting gear 226 moves along the gear rack 2, it turns the gear shaft 222, which in turn rotates the sprocket 228, FIG. 11 and FIG. 16. The sprocket drives a chain over a second sprocket 231, as shown in FIG. 16. The sprocket 231 that is not connected to the gear shaft 222 contains a clutch. The gear 224 also contains a clutch that operates in the opposite direction from the clutch on the sprocket 231. The sprocket 231 and the drive gear 224 mounted on the actuating shaft 220 will be clutching in opposite directions. Thus while the drive gear 223 rotates either to the right or the left, the clutch at the bottom always rotates in one direction driven interchangeably by the lower sprocket or the lower gear 224.

Figure 15:
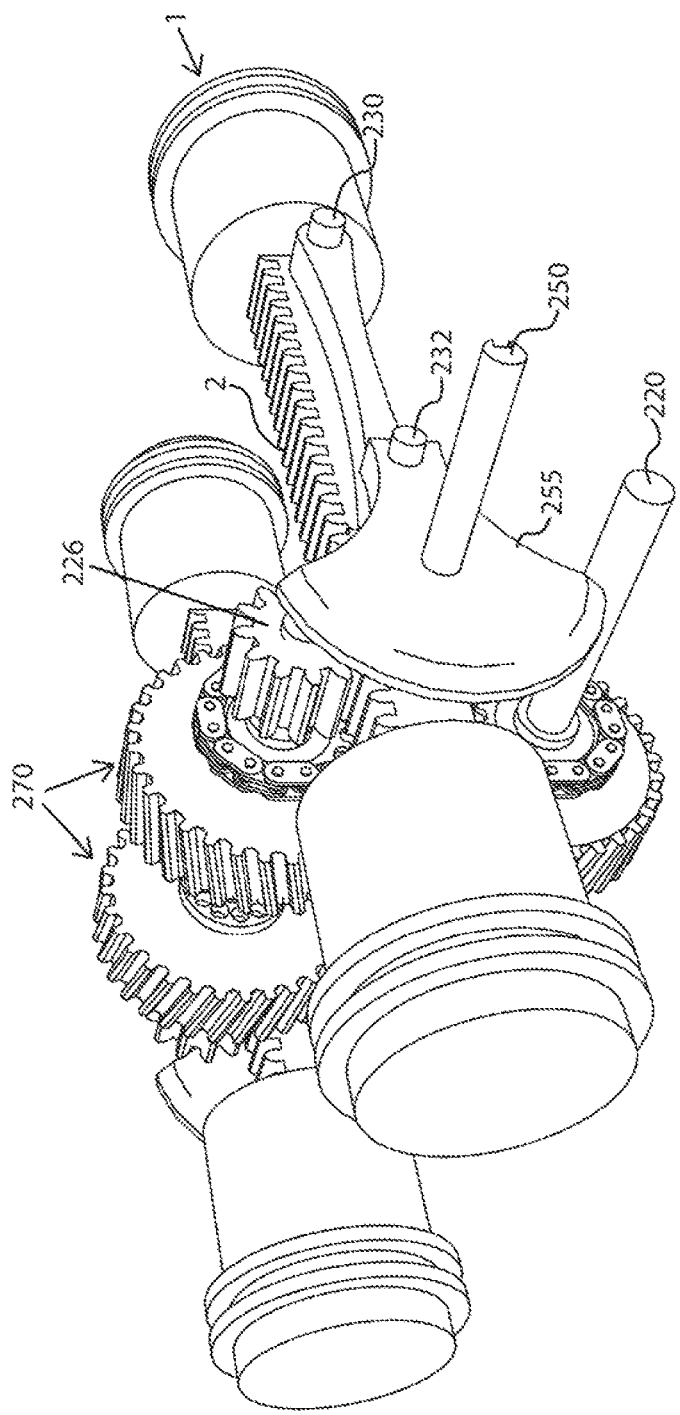
FIG. 15 is a perspective view of an embodiment for several cylinders connected in line to one

When considering FIGS. 11-14 one skilled in the art will appreciate that an engine comprising one gear rack 2 and piston 1 combination, can be connected with at least one additional gear rack 2, as shown in FIG. 15. The additional gear rack 2 being exactly the same or substantially similar to other gear racks 2 in this particular engine. Each such gear rack may have a one way gear transmission 270 that is gyratingly coupled with an actuating shaft 220. To work in concert with one another, the gear transmissions 270 can be sharing the same actuating shaft 220. This combination of gear racks 2 and piston 1 assemblies can be positioned to move inversely with respect to one another, so as to prevent resonance and reduce vibration of an engine disclosed in the present invention. The input shaft 250 may be coming from a conventional starter device, which is powered by the engine's battery, to begin, and continue the operation of such engine. The gear racks 2 may be substantially straight or curved. The present invention may serve as the engine for the actuating shaft 220 in hydraulic devices as described in FIGS. 1-10. The gear rack 2 and piston 1 combination would also effectively replace connecting rods and piston assembly found in gasoline and diesel engines (internal combustion engine), and in most steam engines (external combustion engine). The actuator shaft 220 would replace a standard crank shaft, and the one way gear transmission would function as an analogous transmission found coupled to existing external or internal combustion engines.

FIG. 16 is a detailed diagram of the gear transmission 270. Shown is the connector gear 226, which engages with the gear rack 2 for rotational or gyrational movement. The gear shaft 222, which connects the connector gear 226 with the upper drive wheel and a second upper drive wheel. In the figure the upper drive wheel is shown as a sprocket 228 and the second upper drive wheel is shown as the drive gear 223. The teeth of the drive gear 223 are engaged with the teeth of the second lower drive wheel, which is shown as the lower drive wheel 224. The actuating shaft 220 connects the lower drive wheel, which is again shown as the lower sprocket 231, with the second lower drive wheel that is shown as the drive gear 224. The looped strip of material links the upper drive wheel with the lower drive wheel. In FIG. 16 this is shown in form of a roller chain 227 looping over the upper sprocket 228 and lower sprocket 231. Either or both of the lower sprocket 231 and the lower drive wheel 224 contain clutch mechanisms which are opposite of each other. For the purpose of this invention, clutching also means ratcheting.

The two clutch gears 231 and 224 are opposites of each other, meaning, when the connector gear 226 is rotating in a clockwise direction, the sprocket 228 and the drive gear 223 are spinning in the clockwise direction. The drive gear 224 always moves in the opposite direction of the drive gear 223, while the sprocket 231 is always spinning in the same direction as sprocket 228. Thus, if the desired rotation of the actuating shaft 220 is clockwise, then in the present scenario the sprocket 231 will drive the actuating shaft 220, while the drive gear 224 will be spinning freely or clutching. Once the motion of the gear rack 2 reverses and the connecting gear is rotating in the counterclockwise direction, with the sprockets 228 and 231 and drive gear 223 all rotating counterclockwise, the drive gear 224 is now rotating clockwise and thus driving the actuating shaft 220 in the same clockwise direction. The sprocket 231, while still spinning is actually clutching and not supplying any drive force to the actuating shaft 220, until the rotation of the drive gear 226 is once again clockwise, at which point the process would repeat itself. Thus, while the motion of the gear rack 2 is reciprocating, the direction of the rotation of the actuating shaft 220 is always the same. The direction of rotation of the actuating shaft 220 can be reversed by reversing the drive direction of the clutch wheels 231 and 224. The upper sprocket 228 and the lower sprocket 231 can be replaced with rollers and gears, while a fabric, polymer, rubber or steel ribbon can be used instead of the roller chain 227. The drive gears 223 and 224 can be replaced rollers or wheels, having high friction rolling surfaces. The location of the upper and lower drive wheels 228 and 231 and the location of the second upper and lower drive wheels 223 and 224 can be reversed along their respective shafts 222 and 220.

Figure 17:
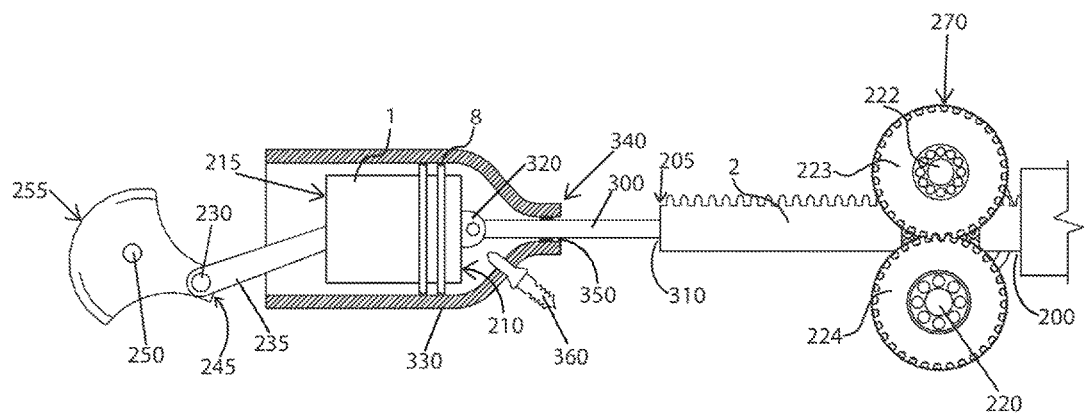
FIG. 17 is a cross sectional diagram of another embodiment of the present invention.

FIG. 17 demonstrates an alternative embodiment of the present invention. Shown are the gear rack 2, the first point 200, the second point 205, the piston 1, the exterior surface 210, the interior surface 215, the actuator shaft 220, the gear shaft 222, the connector gear 223, the gear rack connector pin 230, the connecting rod 235, the input shaft 250, the counterweight 255, the one way gear box 270, the orientation angle 275. Also shown are a pulling shaft 300, joint A 310 and joint B 320, cylinder chamber 330, the top breech 340, the ring gasket 350, and the spark plug 360. The appeal of this embodiment is that the piston 1 is being pulled by the pulling shaft 300, rather than driven forward by the gear rack 2. The advantage of pulling versus pushing is that a driving force tends to be more blunt and weathering on the components being driven whereas a pulling force is gentler. Additionally, this embodiment integrates the engine block architecture known in prior art with the novelty of the present invention.

In the embodiment disclosed in FIG. 17 is launched by manually rotating the input shaft 250. This is usually accomplished with battery power. The rotating input shaft 250 spins the counterweight 255, which in this case can be a component the conventional crank shaft. The counterweight 255 is connected to the connecting rod 235 with a connector pin 230. The connecting rod 235 is pivotingly connected to the inner surface 215. As the piston 1 moves forward, it begins exerting lateral pressure on the pulling shaft 300 which communicates this pressure to the gear rack 2 and to the gearbox 270. As the counterweight 255 completes a rotation arc of 360°, it draws the piston 1 away from the top breech 340, thereby vacating the interior space of the cylinder chamber 330. The cylinder chamber 330 now fills with a combustible solution through cam openings (not shown). The piston 1 then begins to glide toward the top breech 340 compressing the fuel mixture. The spark plug 360 then ignites the fuel mixture using electric current derived from battery or alternator or any other means known in the art, causing the piston assembly comprising elements 1 and 235 to once again move away from the breech 340. The process then repeats itself continuously until the device is shut off. Once battery power initiates the first spin of the input shaft 250, the gear rack 2 and the one way gear box 270 take over driving the piston 1, with the spark plug 360 providing the accelerating force of this embodiment. The actuator shaft 220 provides the rotational output that is necessary to provide driving force to the device or machine that is utilizing this present invention as a source of power, which may be a vehicle, lawn equipment, a power tool a gas generator, or any other machine that utilizes internal combustion engines.

The pulling shaft 300 may be pivotately connected to the gear rack 1 at point 205 and pivotately connected to the exterior surface 210, such that the pulling shaft 300 rocks back and forth as piston 1 closes in and recedes within the cylinder chamber 330.

Figure 18:
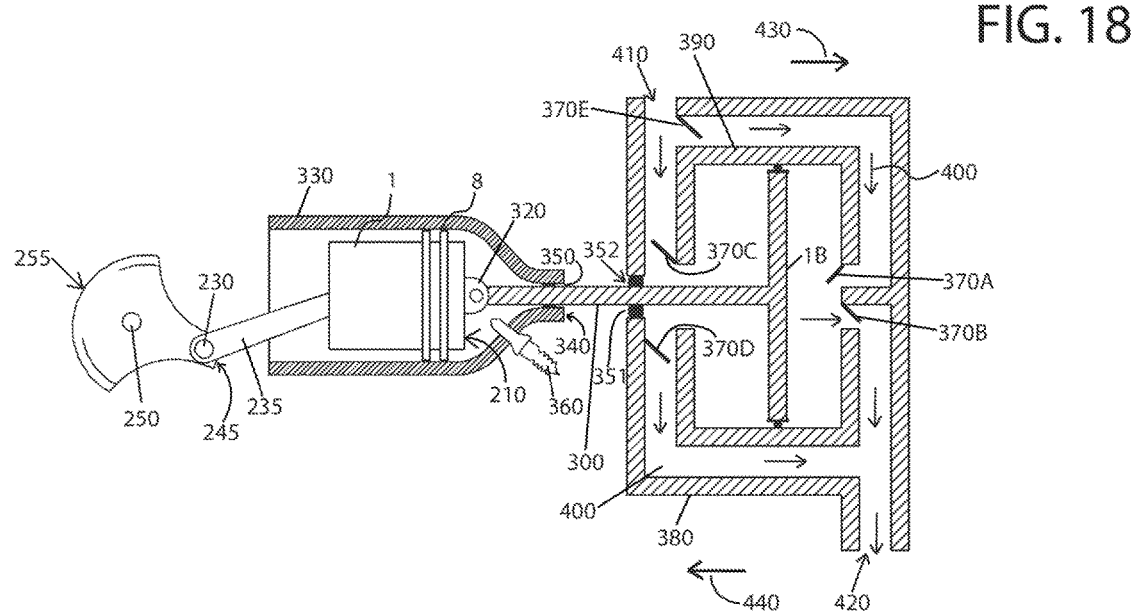
FIG. 18 is a cross sectional diagram of yet another embodiment of the present invention.

FIG. 18 is a demonstration of an application of the present invention where the gear box 270 has been replaced by an inner chamber 390 disposed within an outer chamber 380. Liquid, preferably water, is introduced through the inlet 410 and expelled through the outlet 420. The precise location of the inlet 410 and outlet 420 is not dispositive to enablement.

Water is introduced into the inner chamber 390 through flaps 370C while the water piston 1B is moving in the direction 430, against the inner face 390A. The initial motion is produced by battery power rotating the counterweight 255, which exerts a lateral pressure on the pull shaft 300. During this time valves or flaps 370A and E are closed and the channel 400 between these valves is dry. The cavity of the inner chamber 390 fills up with water against the inner face 390A until the point where the counterweight rotates through 360° and begins to pull the piston 1 in the direction 440. At the same time, the cylinder chamber 330 fills up with combustible materials through cam openings (not shown) and is ignited by the spark plug 360 producing force against the exterior surface 210 which drives the piston 1 in direction 440.

While the water piston 1B is traveling in the direction 440 the cavity of the inner chamber 390 empties through valves 370D through channel 400 and out of the outlet 420. At the same time the cavity of the inner chamber 390 against the outer face 390B begins to fill up with water through valve 370A and 370E. During this time valves 370C and 370B are closed. On the return trip in the direction 430, the outer face 390 B of the piston 1B pushes the water out through valve 370B and out of the outlet 420, while valves 370E, 370D and 370A are closed and only 370C open and introducing water against inner face 390A.

As demonstrated in FIG. 18, there is always flow of liquid from the inlet 410 to the outlet 420. Furthermore, since the water is being forced out of the inner chamber 390, into the narrow channel 400 through the valves 370D or 370B, it exits the outlet 420 with a certain force, which is at least a match to the suction force produced at the inlet 410. As a result, what is shown is a propulsion mechanism that can be used in a liquid medium to propel a machine, such as a vessel, in the direction opposite the force of propulsion. It can be further appreciated by the one skilled in the art that the flow of liquid can be reversed, with outlet 420 forming an inlet and inlet 410 functioning as an outlet. The reversal is accomplished through sequencing of open and shut actions of the valves 370A-E. The valves 370 A-E may be controlled with the force of the flow of water that is induced by the lateral movement of the water piston 1B, or externally through a use of a solenoid (not shown).

In FIGS. 17 and 18 the pull shaft 300 travels through a hermetic ring or seal 350 in the top breach 340. In FIG. 18 there is an additional opening 352 for the pull shaft 300. The opening is sealed with an additional hermetic ring or seal 351.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed:

1. A mechanical device comprising, a gear rack having a first point and a second point; one side of said gear rack having teeth; at least one piston attached either to said first point or said second point; said piston having an exterior surface, said exterior surface known in the relevant art as the piston head, and an interior surface, said interior surface serving as a point of attachment of said at least one piston so said first point or said second point of said gear rack; wherein said exterior surface is facing away from said gear rack and wherein said gear rack is attached to said interior surface; wherein said gear rack is capable of moving in a substantially linear direction due to a force being applied to said exterior surface or said interior surface; a one way gear transmission, said one way gear transmission interposed between said gear rack and said actuator shaft; wherein said one way gear transmission comprises; a connector gear, said connector gear being capable of gyratic engagement with said gear rack; a gear shaft, said gear shaft connecting said connector gear to an upper drive wheel and a second upper drive wheel; said second upper drive wheel in a rotational engagement with a second lower drive wheel; an actuating shaft connecting a lower drive wheel with said second lower drive wheel; wherein said actuator shaft rotating due to the said motion of said gear rack a looped strip of material linking said upper drive wheel with said lower drive wheel; and wherein said lower drive wheel and said, second lower drive gear contain a clutch, wherein said clutch of said lower drive wheel and said clutch of said second lower drive gear are opposite of each other.

2. The mechanical device of claim 1, further comprising a gear rack connector pin; wherein said gear rack connector pin disposed near an end of said gear rack, where said end being either said first point or said second point; a connecting rod having point A and point B, wherein point A of said connecting rod pivotly coupled to an input shaft; and wherein said point B pivotly connected to said gear rack connector pin.

3. The mechanical device of claim 2, further comprising a counterweight; said counterweight having a first point and second point; said first point connected to a pin which connects to said point A; wherein said input shaft is disposed along the surface of said counterweight and perpendicular thereto; and wherein said second point disposed on the counterweight at a location furthest from said first point.

4. The mechanical device of claim 2; further comprising a one way gear transmission, said one way gear transmission interposed between said gear rack and said actuator shaft.

5. The mechanical device of claim 2; further comprising at least one piston said at least one piston attached at an end of said gear rack, wherein said end being either said first point or said second point and opposite another such piston; said piston having an exterior surface, said exterior surface known in the relevant art as the piston head, and an interior surface, said interior surface serving as a point of attachment of said at least one piston so said first point or said second point of said gear rack; wherein said exterior surface is facing away from said gear rack and wherein said gear rack is attached to said interior surface.

6. The mechanical device of claim 1, wherein said gear rack, is substantially straight.

7. The mechanical device of claim 4, further comprising at least one additional gear rack, said additional gear rack having two ends, wherein one of said two ends being a first point and the other of said two ends being a second point and at least one piston mounted on said first point or said second point; said additional gear rack gyratingly coupled with said one way gear transmission; wherein said one way gear transmission gyratingly coupled with said actuating shaft; and wherein said gear rack and said additional gear rack share said actuating shaft.

8. The mechanical device of claim 1, wherein said at least one piston is oriented at ninety degree angle with respect to said gear rack.

9. The mechanical device of claim 2, wherein said at least one piston is oriented at an angle with respect to said gear rack.

10. The mechanical device of claim 4, wherein said gear transmission comprises; a connector gear, said connector gear being capable of gyratic engagement with said gear rack; a gear shaft, said gear shaft connecting said connector gear to an upper drive wheel and a second upper drive wheel; said second upper drive wheel in a rotational engagement with a second lower drive wheel; an actuating shaft connecting a lower drive wheel with said second lower drive wheel; a looped strip of material linking said, upper drive wheel with said lower drive wheel; and wherein said lower drive wheel and said second lower drive gear contain a clutch, wherein said clutch of said lower drive wheel and said clutch of said second lower drive gear are opposite of each other.

11. The mechanical device of claim 10, wherein said upper drive wheel and said lower drive wheel where sprockets, and wherein said looped strip of material is a roller chain.

12. The mechanical device of claim 10, wherein said second upper drive wheel and said second lower drive wheel is a gear.

* * * * *